United States Patent [19]

Killpatrick et al.

[11] Patent Number: 4,871,253
[45] Date of Patent: Oct. 3, 1989

[54] READOUT APPARATUS FOR A LASER ANGULAR RATE SENSOR

[76] Inventors: Joseph E. Killpatrick, 2901 32nd Ave., NE., Minneapolis, Minn. 55418; Glen A. Sanders, 5230 Cottonwood La., Plymouth, Minn. 55442

[21] Appl. No.: 85,218

[22] Filed: Aug. 12, 1987

Related U.S. Application Data

[63] Continuation of Ser. No. 733,297, May 10, 1985, abandoned.

[51] Int. Cl.⁴ ............................................. G01C 19/64
[52] U.S. Cl. ................................................. 356/350
[58] Field of Search ........................ 356/350; 372/94; 358/212

[56] References Cited

U.S. PATENT DOCUMENTS

| | | | |
|---|---|---|---|
| 4,152,072 | 5/1979 | Hutchings | 356/350 |
| 4,204,230 | 5/1980 | Sprague | 358/212 X |
| 4,536,087 | 8/1985 | Shernoff | 356/350 |
| 4,676,643 | 6/1987 | Vescial | 356/350 |

Primary Examiner—Davis L. Willis
Assistant Examiner—S. A. Turner
Attorney, Agent, or Firm—Robert A. Pajak

[57] ABSTRACT

Two electrically isolated photodetectors are responsive to an interference pattern output of a ring laser angular rate sensor. The two photodetectors are constructed to have a periodic pattern of photosensitive zones. The photodetectors are positioned such that the periodic pattern is selectively oriented relative to the interference pattern fringes so as to produce a pair of output signals out of phase with each other in the presence of rotation.

21 Claims, 1 Drawing Sheet

READOUT APPARATUS FOR A LASER ANGULAR RATE SENSOR

This is a continuation of application Ser. No. 733,297, filed May 10, 1985, now abandoned.

FIELD OF THE INVENTION

This invention relates to a readout for ring laser angular rate sensors.

BACKGROUND OF THE INVENTION

Examples of ring laser angular rate sensors are shown and described in U.S. Pat. No. 3,373,650 issued to J. Killpatrick and U.S. Pat. No. 3,390,606 issued to T. Podgorski, both of which are assigned to the assignee of the present invention. Such sensors include a pair of counter-propagating laser beams traveling along an optical closed-loop path including a plurality of mirrors. In order to obtain useful information, a small percentage of the counter-propagating laser beams is allowed to pass through one of the mirrors. The light beams are passed through a prism which combines the beams at slightly different angles and thereby creates a fringe pattern across a surface containing two photodetectors such as photosensitive diodes, each photodetector being much smaller than an individual fringe. Usually the photodetectors are separated by one quarter of a fringe spacing so as to provide readout output signals in phase quadrature. When the ring laser is rotated about its input axis, the counter-propagating beam frequencies change slightly, one increasing and the other decreasing. The difference in beam frequencies results in a beat frequency which is indicated by the rate of movement of the fringe pattern across the photodetectors. The photodetector outputs are fed into a logic circuit to count the number of fringes passing across the photodetector. The number of fringes passing each detector is directly related to the actual angular rotation of the sensor. The two detector output signals are compared to ascertain sensor rotation direction.

The prism optics of the readout determines the angle between the beams which directly forms the interference fringe pattern and the fringe spacing. In the prior art, the prism optics results in an angle between the beams in the order 25 arc seconds and produces only a single fringe. Two photodetectors are used which have photosensitive areas which are less than the width of a fringe spacing and the two photodetectors are separated by approximately one quarter width of a fringe spacing. To accurately achieve this arrangement, the angle between the beams which produce the fringe pattern must be held to tight tolerances.

BRIEF DESCRIPTION OF THE INVENTION

Two photodetectors are arranged to monitor the intensity of an interference fringe pattern of a ring laser angular rate sensor. Each of the photodetectors form, in part, a single periodic pattern of a plurality of photosensitive zones and nonphotosensitive zones. the periodic pattern of photosensitive zones of the photodetectors has a pattern axis, parallel with the direction of periodicity of the pattern, and which is at a predetermined angle relative to the fringes. The angle between the pattern axis and the fringes is selected to produce photodetector intensity output signals which are out of phase with respect to each other in the presence of sensor rotation. The readout of the present invention allows a greater tolerance of the angle between the beams thereby dramatically lowering the cost of an otherwise expensive optical system.

DETAILED DESCRIPTION OF THE INVENTION

Figure 1:
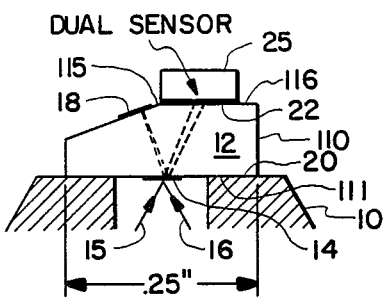
FIG. 1 is an illustration of a ring laser readout system for generating an interference fringe pattern.

FIG. 1 illustrates an optical system for producing an interference fringe pattern resulting from the combining of a portion of each of the laser beams in a ring laser angular rate sensor. FIG. 1 shows only one of the reflection surfaces which defines in part the optical closed-loop path of a ring laser angular rate sensor. Sensor block 10 is of the type shown and described in U.S. Pat. No. 3,390,606 which is incorporated herein by reference thereto.

Fixed to block 10 is mirror/readout prism 12 including substrate 110 for transmitting light. Substrate 110 includes a first major surface 111 suitably polished and optically coated to provide a partially transmissive mirror 14 for reflecting a major portion of beam 16 impinging thereon in a direction opposite of beam 15. Similarly, mirror 14 reflects major portion of beam 15 in the opposite direction of beam 16 in a well known manner so as to provide counter-propagating laser beams within block 10. The angle between beams 15 and 16 depends upon the optical close-loop path chosen, i.e. triangular (60 degrees), rectangular (90 degrees), and the like.

Substrate 110 further includes a second surface 115 suitably polished and optically coated for providing a mirror surface 18. Mirror 18 is positionally located so as to reflect that portion of beam 16 transmitted through mirror 14. Substrate 110 is constructed such that the surface 115 is at a selected angle relative to surface 111 to select the angle between the incident and reflected beams at the surface of mirror 18. The angle between the incident and reflected beams is herein referred to as the "beam angle".

In turn, the reflected beam from mirror 18 is reflected from mirror 14 so as to travel at a slight angle relative to that portion of beam 15 transmitted through mirror 14. This latter mentioned angle is substantially equal to the aforementioned "beam angle". The transmitted portion of beam 15 through mirror 14 and the doubly reflected portion of beam 16 arrive at transmissive surface 116 so as to form an interference fringe pattern on the surface thereof.

The "beam angle" between the incident and the reflected beams at the surface of mirror 18 substantially determines the interference pattern at the surface 116 of substrate 110. As the angle increases therebetween, the fringe spacing of the interference fringe pattern at the surface 116 decreases. In the prior art, the beam angle between the incident and reflected beams would be in the order of 25 arc seconds thereby establishing a relatively large fringe spacing. In the present invention, it is desirable to have a beam angle to minimize directing the reflected beam from mirror 18 back into the block 10 in the opposite direction of beam 16 to avoid lock-in and large enough to create a discernable plurality of interference fringes. This criteria is met when the beam angle is in the order of 1 to 60 arc minutes. A choice of 20 to 40 arc minutes provides a reasonable number of interference fringes in a relatively small space relative to the photodetectors as will be subsequently described.

Also shown in FIG. 1 is a dual photodetector sensor 25 coupled to surface 116 for being responsive to the interference fringe pattern passing therethrough. Although in the preferred embodiment, sensor 25 is ridgedly secured to surface 116, sensor 25 may be spatially removed from surface 116 but still be responsive to the interference fringe pattern transmitted through surface 116.

In the present invention, a single mask pattern is placed in front of two photodetectors of sensor 25 as a means of selecting the spatial portions of the fringe pattern that each detector samples. To measure the direction of fringe motion, and hence the direction of rotation, the mask is tilted with respect to the fringe pattern. By using this technique, a phase difference between the two detector signals is obtained and then utilized to determine the direction of rotation.

Figure 2:
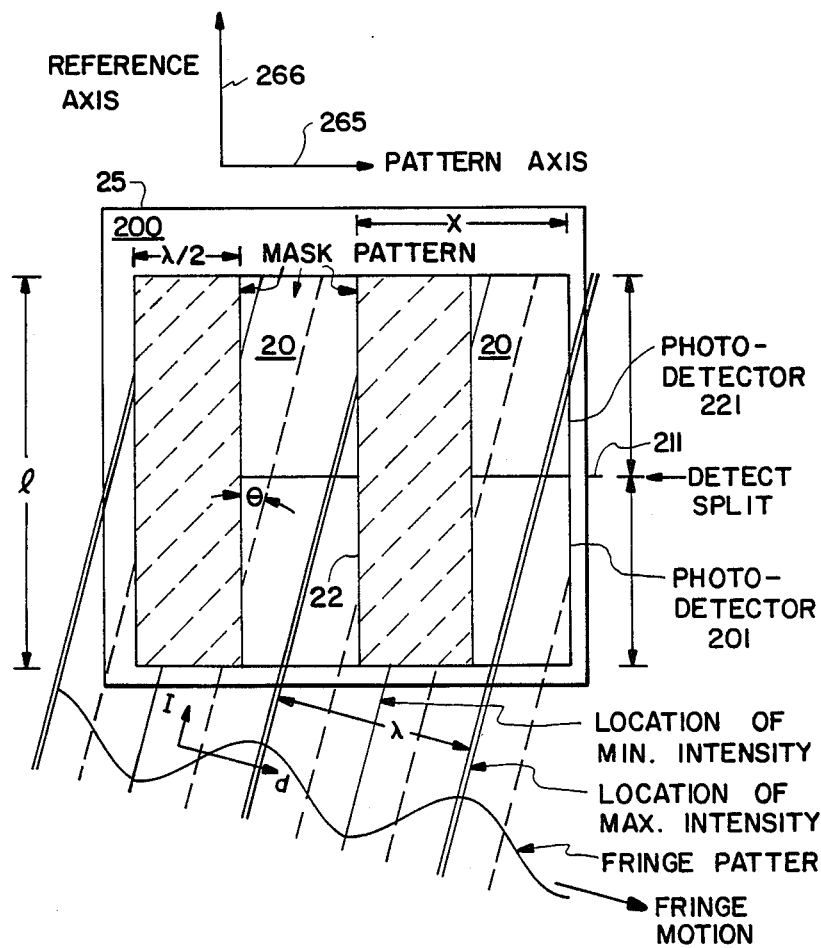
FIG. 2 is a diagramatic representation of a dual photodetector readout of the present invention.

In FIG. 2, thereshown is dual photodetector sensor 25 comprised of a first photodetector 201 having, by way of illustration, a rectangular photosensitive area on substrate 200. Also shown is a second photodetector 221 having a rectangular photosensitive area similar to that of photodetector 201. Photodetectors 201 and 221 are electrically isolated from one another and shown to have substantially equal photosensitive areas. As illustrated in FIG. 2, the photosensitive areas are symmetrically adjacent to each other.

The two photodetectors are masked by a single periodic mask pattern consisting of a pattern of transparent zones 20 and nontransparent zones 22 having a periodic repetition of period "x" nominally equal to the fringe period or spacing $\lambda$. The mask pattern is intended to sufficiently cover photodetectors 201 and 221 resulting in each detector having the same periodic pattern of photosensitive zones 20.

Associated with the periodic mask pattern is a pattern axis 265 which is parallel to the direction of periodicity of the pattern. In the present invention the pattern axis of the periodic mask pattern is intended to be at a selected angle relative to the interference fringe pattern. Further, the photodetectors 201 and 221 are positioned such that there exists a reference axis 266 prependicular to the pattern axis and which passes through photosensitive zones of each photodetector. The reference axis is established to geometrically define the orientation of the detectors and pattern relative to the interference fringes.

Also shown in FIG. 1 is an intensity versus displacement profile of interference fringe pattern at an angle $\theta$ relative to the pattern axis. The profile shows intensity (I) vs. displacement on the surface 116 of substrate 110. Figuratively denoted in FIG. 2 are maximum intensity, minimum intensity, and half-maximum intensity portions of the fringe pattern incident on the periodic mask pattern, these portions are denoted by double solid lines, single solid lines and dashed lines, respectively.

It should be noted that the detector responds to a resultant second beam spot or interference fringe pattern different than the output beam spot which is transmitted through surface 116 of substrate 110. The resultant beam spot is the result of passing the output beam spot through the periodic mask pattern before impinging on portions of detectors 201 and 221. The resultant beam spot can be conceptually thought of as a moire fringe motion or an interference fringe pattern which is characterized by an array of high and low intensity light regions which move transverse to fringe motion of the output beam spot fringes when the pattern axis 265 of the periodic mask pattern is at an appropriate angle relative to the fringes of the output beam spot.

Referring to FIG. 2, visually, the high intensity "double lines" appear to move with motion transverse to the output beam spot. That is, they appear to move diagonally from the top-left toward bottom right corners of the transparent regions 20 of the mask and photosensitive zones of photodetectors 221 and 201 as fringes move as illustrated.

Although this effective second spot fringe motion may be described as above, the important criteria in the present invention is that the angle selected between the pattern axis and the output beam spot fringes must be one that the total integrated light intensity power which impinges individually on the two detectors 201 and 221 is sufficiently different on the two detectors to discern direction of the motion of the fringe of the output beam spot.

For simplicity, it is assumed here that all spatial intensity variations in the region of the mask are due solely to the interference between output beams at surface 116 of substrate 110, i.e. each individual beam is assumed to have a uniform intensity distribution over the extent of the mask. For instance, all points on the maximum intensity contours (double solid lines) have equal intensity, all points on the minimum intensity contours (single solid lines) have equal intensity, etc. It is also assumed that detector 201 samples all the light intensity transmitted through the transparent zones of the lower half of the mask (below the detector split 221). Likewise detector 221 samples all the light intensity transmitted through the transparent zones of the upper half of the mask.

By way of the present invention, it is intended that the two photodetector output signals be in phase quadrature in the presence of pattern movement caused by sensor rotation. To achieve this, the angle $\theta$ should be:

$$\theta = \tan^{-1}\left[\frac{x}{2L}\right] \quad (1)$$

where L is the total width of the interference fringe pattern, i.e., spot beam. The total width being substantially the length of the interference fringes of the fringe pattern.

Figure 3A:
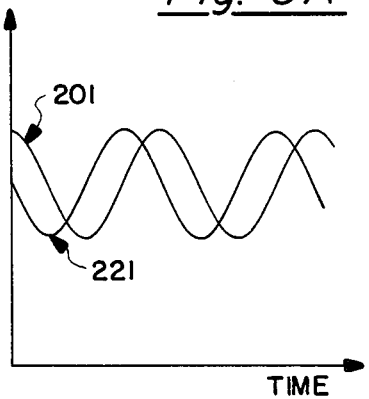
FIGS. 3a and 3b are graphs of photodetector output signals in the presence of rotation.
Figure 3B:
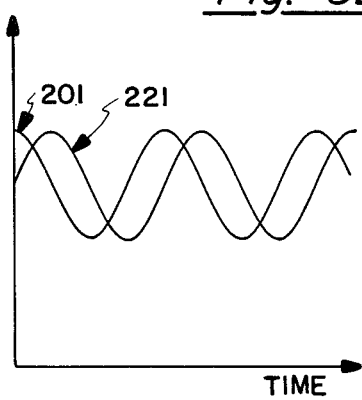

FIG. 3 illustrates the phase quadrature photodetector output signals in the presence of sensor rotation. The reader should observe that the toal integrated power on detector 201 is substantially maximized while the total integrated power on detector 221 is substantially at half maximum. The photodetector output signals as a function of time in the presence of rotation are shown in FIGS. 3a and 3b, for the cases of fringe motion to the right and to the left, respectively. In the case of fringe motion to the right, the output of detector 201 lags that of detector 221 by 90 degrees (denoted by a phase difference of $-90$ degrees). In the case of fringe motion to the left, the output of detector 201 leads that of detector 221 by 90 degrees (denoted by phase difference $+90$ degrees). The direction of fringe motion is then related to the direction of rotation.

As explained above, a uniform beam intensity profile over the extent of the mask was assumed here for the sake of simplicity. In principle, this technique can be generalized to achieve a phase difference range of ±180 degrees. The angle to achieve a 90 degree phase difference (or any other desired phase difference) will depend on the intensity distribution. For example, in many practical cases, involving Gaussian beam profiles, the mask size and detector sizes are large compared to the beam spot size. In these cases, when the energy of fringe pattern is concentrated closer to the detector split (assuming the beam is centered on the detector split) the angle $\theta$ must be in general greater than $$\tan^{-1}\left[\frac{X}{2L}\right]$$

to achieve a 90 degree phase difference.

It should be recognized that photodetectors 201 and 221 have an output signal representative of the integrated intensity of light impinging on the photosensitive areas exposed to the interference fringe pattern thereof. Such output signals and connection means are not shown in FIG. 1. In the absence of the periodic mask pattern, the output signals of photodetectors 201 and 221 will be substantially equal. However, with the masked dark lines 20 and 22 in place, the two photosensitive areas have output signals which are out of phase with one another as already described.

FIGS. 4 and 5 show further examples of periodic mask patterns other than parallel rectangular areas are within the scope of the present invention. All that is required, as before, is that the pattern axis should be at the selected angle to provide two signals which are out of phase with each other sufficient to discern direction of a moving interference fringe pattern.

In accordance with the invention, any periodic mask pattern which causes the photodetector output signal to periodically vary as a function of the periodic movement of the interference fringe pattern is within the scope of the present invention.

It should be recognized by those skilled in the art that a pair of signals out of phase with one another is sufficient for subsequent ring laser angular rate sensor readout electronics for determining both angular rotation, rate, and direction in a well known manner.

It should be recognized by those skilled in the art that the dual photodetector sensor 25 including photodetectors 201 and 221 and accompanying periodic mask pattern having the intended output maybe manufactured by a variety of techniques. The example illustrated in FIG. 2 is one in which the photosensitive area of each photodetector is masked by a material which permits only unmasked or selected photosensitive zones to be responsive to impinging light. Alternatively, the resulting photosensitive zones may be, by way of example, a serpentine pattern of photosensitive areas for each photodetector. Further, another alternative may comprise a semiconductor comprising a plurality of photosensitive zones interconnected within the body of the semiconductor.

Thus, there are many combinations of a dual photodetector sensor 25 and mirror/readout reflector 12 which provide the intended function in a low cost manner. Namely, the dual photodetector sensor 25 may be an integrated circuit which can be optically cemented, and the like, to the surface 116 for obtaining the intended signals. On the other hand, surface 116 may be optically coated to provide the mask on the surface 116 and the dual sensor may then be optically cemented above the mask.

The combination set forth by the present invention sets forth a unitary mirror/readout reflector and dual photodetector system which is easily aligned and allows for greater flexiblity and tolerances in the manufacturing process. A combination of these elements allows a low cost and lightweight design for ring laser angular rate sensors.

It should also be noted that although the diagram illustrated in FIG. 1 shows beam angles normally associated with triangular lasers, the principles of the invention are applicable to ring laser angular rate sensors having greater than three sides including four, five, and the like.

Therefore, while the present invention has been disclosed in connection with the preferred embodiments thereof, it should be understood that there may be other embodiments which fall within the spirit and scope of the invention as defined by the following claims.

The embodiments of the invention in which an exclusive property or right is claimed are defined as follows:

1. A readout apparatus responsive to clockwise and counter-clockwise counter-rotating light beams that have a frequency difference relatable to the rate of rotation of a ring laser gyroscope, said readout apparatus comprising:
   means for removing a portion of the light beams from the ring of said ring laser gyroscope;
   means for displacing the removed counter rotating beams to overlap a portion of the light of the removed beams to form a first spot beam having fringe motion characterized by an array of alternating regions of high and low intensity light within said first spot;
   a single mask having an array of co-parallel, alternating transparent and opaque stripes;
   said mask being positioned to be normal to said first spot beam and to direct said fringe motion of said first spot beam through said single mask;
   said single mask array of alternating and opaque regions being aligned to form a second spot beam having a moire fringe motion characterized by an array of alternating regions of high and low intensity light within said spot moving transverse to said fringe motion within said first spot beam; and
   means for receiving said second spot beam and for detecting said moire fringe motion within said second spot beam characterized by an array of alternating regions of high and low intensity light within said second spot moving transverse to said fringe-motion of said first spot beam.

2. The readout apparatus of claim 1 wherein said means for removing a portion of light beam from the ring of said ring laser gyroscope further comprises:
   a transmissive substrate coupled to the body of said ring laser gyroscope;
   a partially transmissive means formed on a first surface of said substrate, said first surface being positioned to receive the clockwise and counterclockwise counter rotating beams at a first spot on said partially transmissive means and to transmit a portion of each beam through said partially transmissive means, through said substrate to said means for displacing the removed counter-rotating beams.

3. The readout apparatus of claim 1 wherein said means for displacing the removed counter-rotating beams to overlap and form said first spot further comprises:

a prism means having a receiving surface positioned to receive said removed counter-rotating light beams from said means for removing a portion of the light beams from the ring of said ring laser gyroscope, and a transmitting surface;

said prism means having an internal reflective surface positioned to internally reflect a first of said removed counter-rotating beams and to combine said removed first beam with the remaining second removed counter-receiving beam;

said internal reflective surface having means for producing said internal reflection, said beam displacement and overlap to form said first spot beam and to direct said first spot beam through said transmitting surface;

said mask being interposed between said transmitting surface and said receiving means.

4. The readout apparatus of claim 1 wherein:

said means for removing a portion of light beams from the ring of said ring laser gyroscope further includes, a transmissive substrate coupled to the body of said ring laser gyroscope, and a partially transmissive reflective means formed on a first surface of said substrate, said first substrate being positioned to receive the clockwise and counterclockwise beams at a first spot on said partially transmissive reflective means and to transmit a portion of each beam through said partially transmissive reflective means, through said substrate to said means for displacing the removed counter-rotating beams; and said means for displacing said counter-rotating beams includes a reflective means formed on a second surface of said substrate, said second surface being positioned to internally reflect a first one of said removed counter-rotating beams toward said spot on said first surface and to combine said removed first beam with the remaining second removed counter-clockwise beam for producing said beam displacement and overlap to form said first spot beam and to direct said first spot beam through a third transmissive surface portion on said substrate.

5. The readout apparatus of claim 4 wherein said mask is interposed between said third transmissive surface portion and said receiving means.

6. The readout apparatus of claim 1, wherein said receiving means comprises:

first and second photosensitive means each having a photosensitive area for responding to at least a portion of said second spot beam impinging thereon.

7. A readout apparatus for a laser angular rate sensor having counter-propagating laser beams which exhibit a change in frequency dependent upon rotation rate and direction, said readout comprising:

means for optically combining a portion of each of said beams to produce an interference fringe pattern;

first and second photosensitive means each having a portion of said interference fringe pattern impinging thereon;

a single mask having a periodic mask pattern of transparent and opaque regions in which there exists a pattern axis in parallel to the direction of periodicity of said periodic mask pattern, and in which said periodic mask pattern is interposed between said first and second photosensitive means and said interference fringe pattern to cause said interference fringe pattern to pass through said mask and impinge on said first and second photosensitive means; and said periodic mask pattern being positioned relative to said interference fringe pattern such that said pattern axis is at a selected angle relative to said fringes to cause the integrated power of those portions of said interference fringe pattern impinging on said first and second photosensitive means to be sufficiently different in response to a fringe movement of said interference fringe pattern in order to discern direction of said fringe movement.

8. A readout apparatus for a laser angular rate sensor having counter-propagating laser beams which exhibit a change in frequency dependent upon rotation rate and direction, said readout comprising:

means for optically combining a portion of each of said beams to produce an interference fringe pattern;

first and second photosensitive means each having a photosensitive area for responding to at least a portion of said interference fringe pattern impinging thereon, and providing first and second output signals, respectively, representative of the light intensity of any portion of said interference fringe pattern impinging thereon;

a single mask having a periodic mask pattern of transparent and opaque regions in which there exists a pattern axis in parallel to the direction of periodicity of said periodic mask pattern, and in which said periodic mask pattern is interposed between said first and second photosensitive means and said interference fringe pattern to cause said interference fringe pattern to pass through said mask and impinge on said first and second photosensitive means; and said periodic mask pattern being positioned relative to said interference fringe pattern such that said pattern axis is at a selected angle relative to said fringes to cause said first and second output signals to be out of phase with each other in response to a fringe movement of said interference fringe pattern.

9. The apparatus of claim 8 wherein said periodic mask pattern in a plurality of parallel transparent and opaque lines.

10. The apparatus of claim 8 wherein said periodic pattern has a period substantially equal to the period of said interference fringe pattern.

11. The apparatus of claim 11 wherein said periodic pattern is a plurality of parallel transparent and opaque stripes in which said stripes have a width substantially equal to one half of the period of said periodic pattern.

12. The readout apparatus of claim 8 wherein said means for combining said beam comprises:

a transmissive substrate coupled to the body of said ring laser gyroscope, and a partially transmissive reflective means formed on a first surface of said substrate, said first surface being positioned to receive the clockwise and counterclockwise beams at a first spot on said partially transmissive reflective means and to transmit a portion of each bean through said partially transmissive reflective means, through said substrate toward a second surface on said substrate; and a reflective means formed on said second surface of said substrate, said second surface being positioned to internally reflect a first one of said removed counter-rotating beams toward said spot on said first surface and to combine said removed first beam with the remaining second removed counter-rotating beam for producing a beam displacement and overlap to form said first spot beam and to direct said first spot beam through a third transmissive surface portion on said substrate.

13. A readout apparatus for a laser angular rate sensor having counter-propagating laser beams which exhibit a change in frequency dependent upon rotation rate and direction, said readout comprising:

means for optically combining a portion of each of said beams to form an first interference fringe pattern;

a single mask having an array of alternating transparent and opaque regions;

said mask being positioned to be normal to said first interference fringe pattern and to direct said first interference fringe pattern through said single mask, said single mask array of alternating transparent and opaque regions being aligned at a selected angle relative to said first interference fringe pattern to form a resultant second interference fringe pattern resulting from said first interference fringe pattern passing through said mask;

said selected angle being such to cause said second interference fringe pattern to have alternating regions of high and low light intensity regions which move transverse to the direction of movement of fringes of said first interference fringe pattern; and means for receiving said second interference fringe pattern and for detecting motion of said alternating high and low intensity light regions of said second interference fringe pattern.

14. The apparatus of claim 13 wherein:

said means for receiving said beams includes first and second photosensitive means each having a photosensitive means each having a photosensitive area for responding to at least a portion of said second interference fringe pattern impinging thereon, and providing first and second output signals, respectively, representative of the light intensity of any portion of said interference fringe pattern impinging thereon; and said selected angle is such that said first and second output signals are out of phase with each other.

15. The apparatus of claim 14 wherein said selected angle is such that said first and second output signals are substantially in phase quadrature.

16. The apparatus of claim 13 wherein said mask is a periodic mask pattern having a plurality of parallel transparent and opaque stripes.

17. The apparatus of claim 13 wherein said mask is a periodic pattern having a period substantially equal to the period of said first interference fringe pattern.

18. The apparatus of claim 13 wherein said mask is a periodic pattern having a plurality of parallel transparent and opaque stripes in which said stripes have a width substantially equal to one half of the period of said periodic pattern.

19. A readout apparatus for a laser angular rate sensor having counter-propagating laser beams which exhibit a change in frequency dependent upon rotation rate and direction, said readout comprising:

means for optically combining a portion of each of said beams to form an interference fringe pattern;

first photosensitive means having a periodic first output signal representative of the light intensity of any portion of said interference fringe pattern impinging thereon, said periodic pattern defining a pattern axis in parallel to the direction of the periodicity of said periodic pattern; and second photosensitive means having a periodic pattern of photosensitive zones substantially identical to said first periodic pattern for providing a second output signal representative of the light intensity of any portion of said interference fringe pattern impinging thereon; and said first and second photosensitive means being positioned relative to said interference fringe pattern such that said pattern axis is at a selected angle relative to said fringe pattern to cause said first and second output signals to be out of phase with each other in response to moving fringes of said interference fringe pattern.

20. The readout apparatus of claim 19 wherein said first and second photosensitive means each include a photosensitive area having parallel photosensitive and insensitive zones.

21. A readout apparatus for a laser angular rate sensor having counter-propagating laser beams which exhibit a change in frequency dependent upon rotation rate and direction, said readout comprising:

means for optically combining a portion of each of said beams to produce an interference fringe pattern;

photosensitive means having a photosensitive area for responding to at least a portion of said interference fringe pattern impinging thereon, and providing first and second output signals, respectively, representative of the light intensity of first and second portions, respectively, of said interference fringe pattern impinging thereon;

a single mask having a periodic mask pattern of transparent and opaque regions in which there exists a pattern axis in parallel to the direction of periodicity of said periodic mask pattern, and in which said periodic mask pattern is interposed between said first and second photosensitive means and said interference fringe pattern to cause said interference fringe pattern to pass through said mask and impinge on said first and second photosensitive means; and said periodic mask pattern being positioned relative to said interference fringe pattern such that said pattern axis is at a selected angle relative to said fringes to cause said first and second output signals to be out of phase with each other in response to a fringe movement of said interference fringe pattern.

* * * * *

UNITED STATES PATENT AND TRADEMARK OFFICE
CERTIFICATE OF CORRECTION

PATENT NO. : 4,871,253
DATED : October 3, 1989
INVENTOR(S) : JOSEPH E. KILLPATRICK & GLEN A. SANDERS It is certified that error appears in the above-identified patent and that said Letters Patent is hereby corrected as shown below:

Column 8, line 55, after claim, delete "11" and substitute --8--

Signed and Sealed this

Eleventh Day of December, 1990

*Attest:*

HARRY F. MANBECK, JR.

*Attesting Officer*      *Commissioner of Patents and Trademarks*